Oct. 13, 1953 W. SIEGERIST 2,655,066
FEEDING AND CLAMPING MEANS FOR CENTERLESS
BAR TURNING MACHINES
Filed Nov. 19, 1947 3 Sheets-Sheet 1
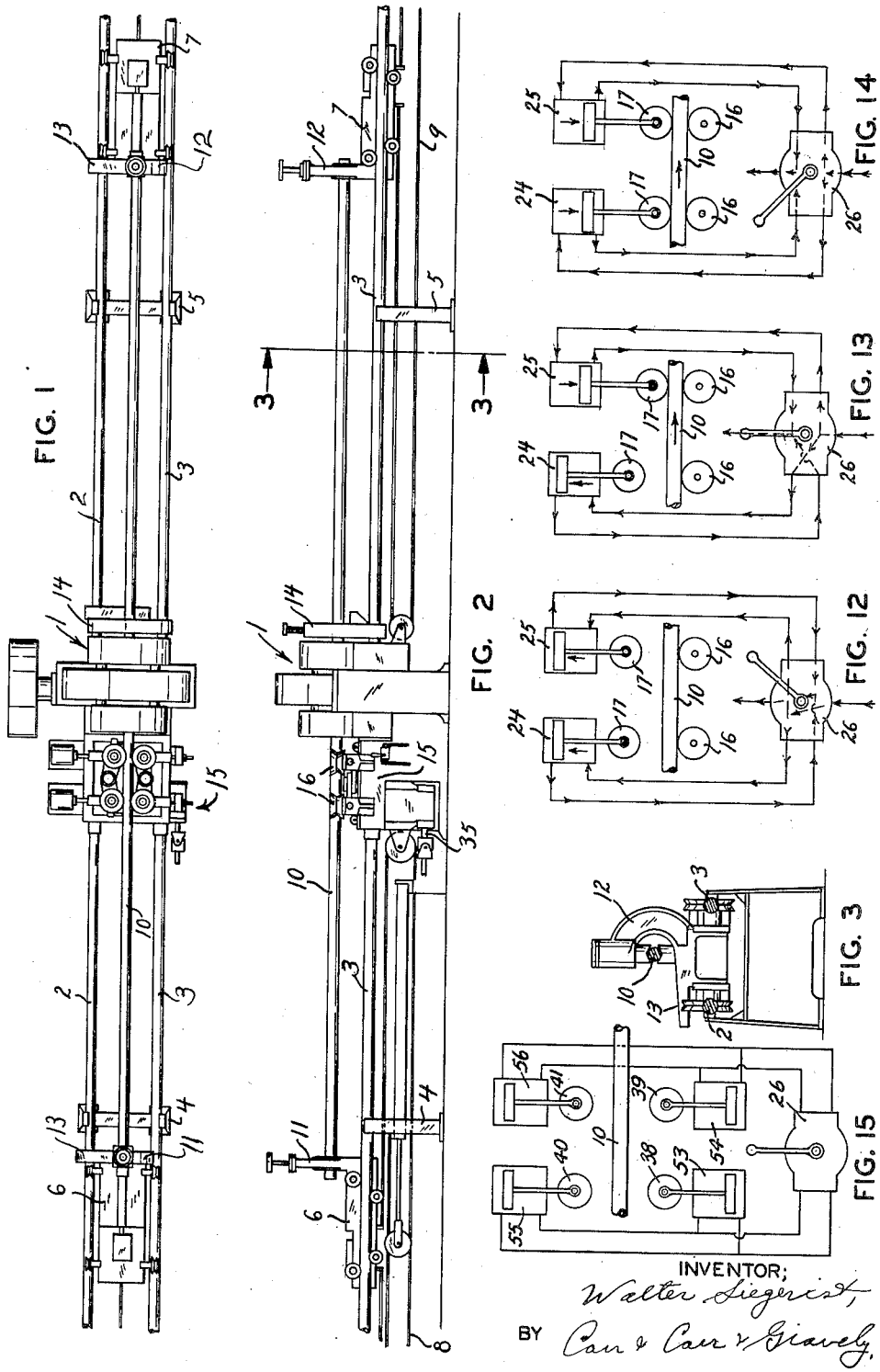
INVENTOR:
Walter Siegerist,
BY Carr & Carr & Gravely
HIS ATTORNEYS Oct. 13, 1953 W. SIEGERIST 2,655,066
FEEDING AND CLAMPING MEANS FOR CENTERLESS
BAR TURNING MACHINES
Filed Nov. 19, 1947 3 Sheets-Sheet 2

INVENTOR:
Walter Siegerist,
BY Carr & Carr & Gravely
HIS ATTORNEYS

Oct. 13, 1953
W. SIEGERIST
2,655,066
FEEDING AND CLAMPING MEANS FOR CENTERLESS
BAR TURNING MACHINES
Filed Nov. 19, 1947
3 Sheets-Sheet 3
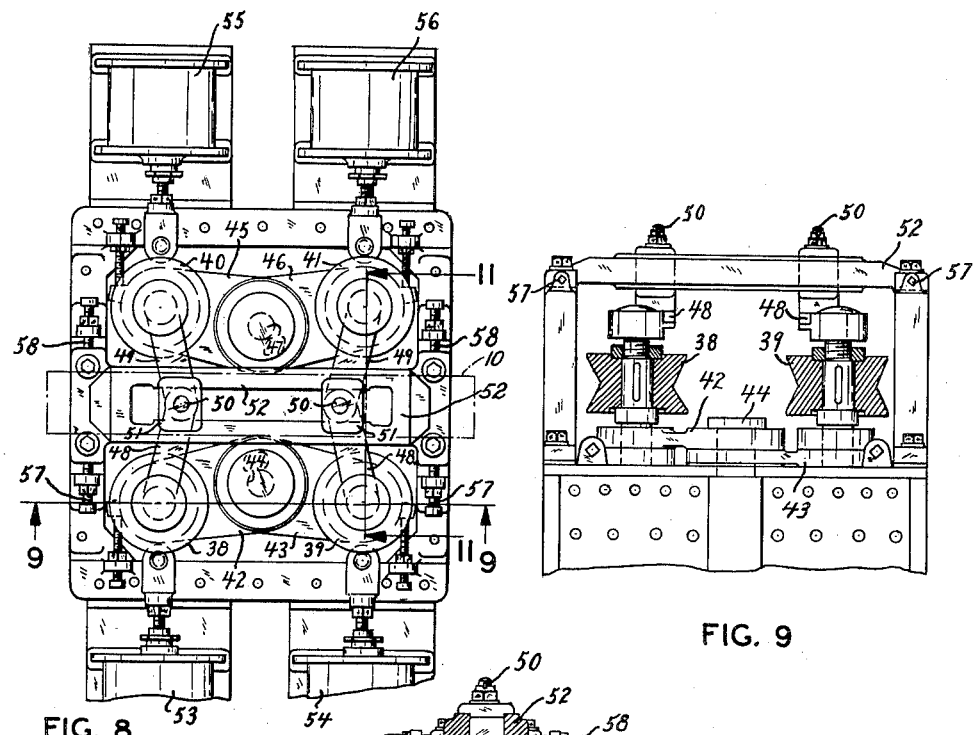
FIG. 8
FIG. 9
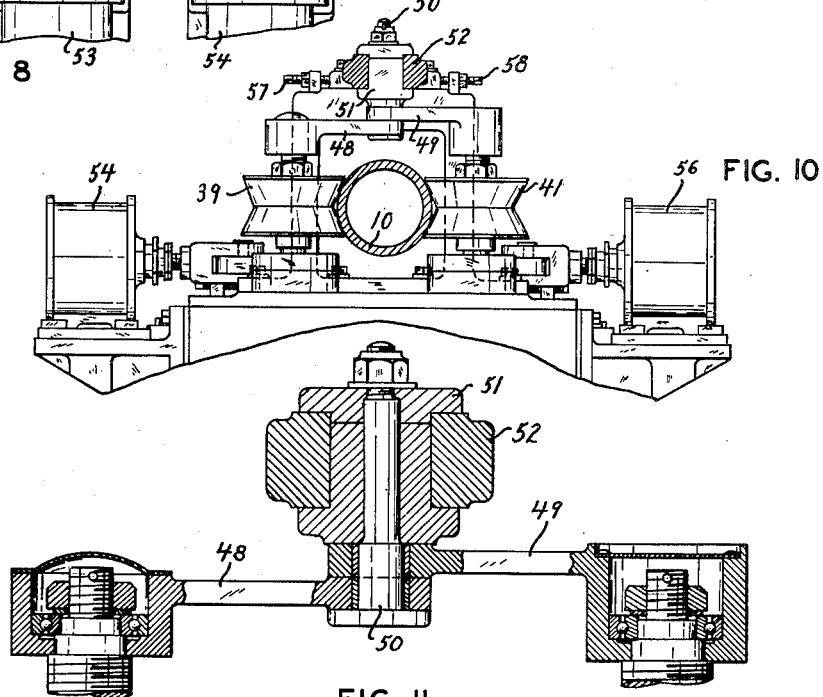
FIG. 10
FIG. 11
INVENTOR;
Walter Siegerist,
BY Carr & Carr & Gravely,
HIS ATTORNEYS Patented Oct. 13, 1953

2,655,066

UNITED STATES PATENT OFFICE 2,655,066

FEEDING AND CLAMPING MEANS FOR CENTERLESS BAR TURNING MACHINES

Walter Siegerist, University City, Mo.

Application November 19, 1947, Serial No. 786,900

7 Claims. (Cl. 82—20)

This invention relates to a mechanism for machining bar stock and in its more specific aspects is directed to an improved centering arrangement for the machine by means of which the bar stock will be properly fed into and through the machine tool mechanism.

The object of this invention is to provide a centering and feeding mechanism for a machine in which the parts thereof are suitably disposed so as to provide for the proper holding and centering of the work piece with respect to the cutter on the machine tool so that a much more accurately finished work piece will be produced.

Another object of the invention is to provide a self-centering mechanism for feeding bar stock to the cutter of the machine tool in which the centering device has means thereon for gripping the bar stock which cooperates with the ordinary feed mechanism thereon so as to produce a more accurate and uniformly finished work piece.

In the drawings:

Fig. 1 is a plan view of a machine tool incorporating the invention,

Fig. 2 is a side elevational view of the machine tool illustrated in Fig. 1,

Fig. 3 is a sectional view taken along the line 3—3 of Fig. 2,

Figure 4:
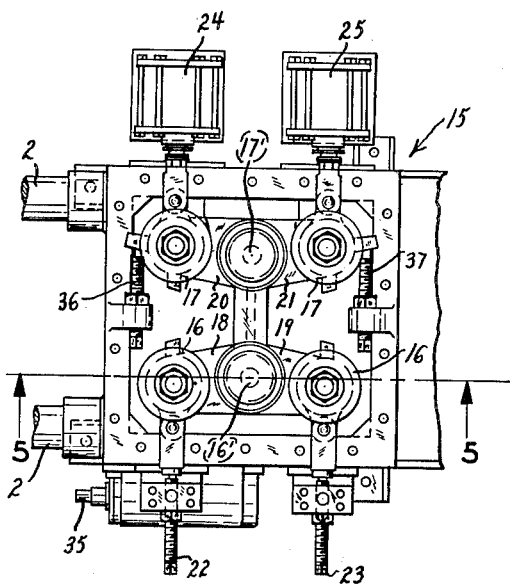
Fig. 4 is a plan view of an enlargement of the centering and feeding device.
Figure 6:
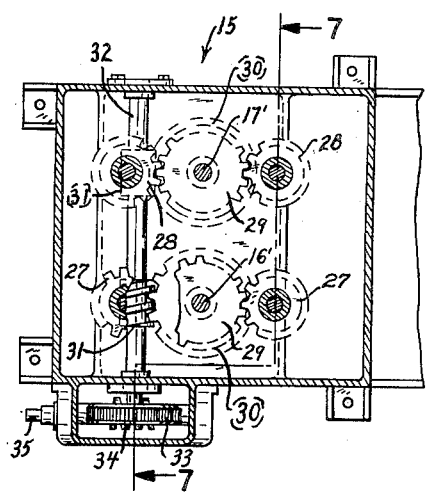
Figure 5:
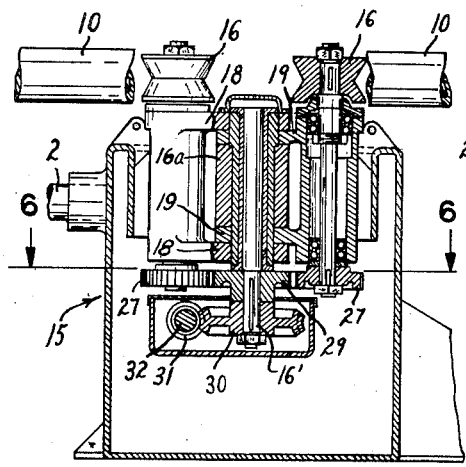
Figure 7:
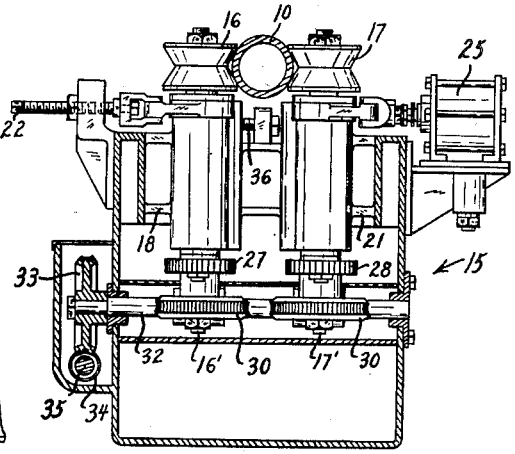

Fig. 5 is a vertical sectional view taken substantially along the line 5—5 of Fig. 4, Fig. 6 is a sectional view taken substantially along the line 6—6 of Fig. 5, Fig. 7 is a vertical sectional view taken along the line 7—7 of Fig. 6, Fig. 8 is a plan view of a modified form of the invention illustrated in Fig. 4, Fig. 9 is a vertical sectional view of the upper portion of the device of Fig. 8 taken substantially along the line 9—9 thereof, Fig. 10 is an end elevational view of the upper portion of the device illustrated in Fig. 10 with parts broken away to show detail, Fig. 11 is a sectional view taken substantially along the line 11—11 of Fig. 8, Figs. 12, 13, and 14 illustrate schematic hydraulic circuits for the pressure fluid devices illustrated in Figs. 4 and 8; and Fig. 15 illustrates the hydraulic circuit for the modified form of the invention.

Referring now to the drawings, numeral 1 generally designates a centerless bar turning machine for turning long pieces of round bar stock and is of the type illustrated in United States Patent No. 2,334,887. The machine has secured to each end thereof one end of suitable rail structures 2 and 3 that are properly supported in the machine tool 1 and the rails are further properly supported by suitable standards 4 and 5, only one of which is illustrated in Figs. 1 and 2, on each side of the machine tool. Suitably disposed on each of the supports or rails 2 and 3, for movement therealong, are roller supported mechanisms 6 and 7 for gripping the ends of work piece 10. These mechanisms are connected to suitable means (not shown) for moving the mechanisms 6 and 7 along the rails or supports 2 and 3. These connecting means are cable or chains 8 and 9, each of which is fitted around suitable sheaves rotatably supported on the machines, all of which structure is shown in the above identified patent.

The ends of the work piece 10 are clamped in clamps 11 and 12 mounted on mechanisms 6 and 7 and more particularly illustrated in Fig. 3. These clamps prevent a whipping action taking place in the ends of the work piece. Each of these clamps is provided with a run-off surface 13 so that the finished piece of work may roll clear of the machine when released from the clamps. The machine tool 1 is also provided with a steady rest 14 to support the work piece 10 adjacent the machine tool on the output side thereof.

The input side of the machine tool 1 is provided with a centering device generally designated by the numeral 15. This centering device consists of a plurality of rollers 16, 16 and feed rollers 17, 17 supported on suitable spindles, each of which is independently rotatably mounted in suitable arms 18, 19, 20, and 21, the latter two arms rotatably supporting rollers 17, 17 and the former two rotatably supporting rollers 16, 16. The arms 18 and 19 are pivotally supported on pin 16' about which is fitted a spacer sleeve 16a, as shown in Fig. 5, and arms 20 and 21 are similarly pivotally supported on pin 17'. This enables the arms to be adjusted toward and away from the work piece and machine cutter axis that passes through the centering device 15. Rollers 16, 16 are manually moved by adjusting screws 22 and 23. These are suitably rotatably supported in appropriate nuts held in the centering device and are only adjusted for reception of different diametered work pieces that are fed into the machine tool 1.

The feed rollers 17, 17 are moved toward and away from the work piece 10 by means of pressure fluid motors 24 and 25, the piston rods of which are pivotally connected to the arms 20 and 21. The hydraulic circuit for these motors is illustrated in Figs. 12, 13, and 14, valve 26 therein being a three-position valve or equipped for as many settings or positions as there are pairs of rollers 16, 16 and 17, 17 to move toward and away from each other. The sequence of operation of the device set forth herein is such that pressure fluid motor 25 is actuated first as to bring its roller 17 into engagement with the work piece 10 and after this operation has been performed, the valve is moved to the next position so that pressure fluid motor 24 is operated so that its roller 17 is brought into engagement with the work piece 10. The valve 26, when kept in the position illustrated in Fig. 14, will maintain both of the rollers 17 in firm engagement with the work piece. This sequential operation with the previously adjusted rollers 16, 16 will maintain the work piece substantially aligned with the cutter in the machine tool 1 and will assist in producing the intended terminal results on work piece 10.

Each of these sets of rollers 16, 16 and 17, 17 is positively driven by means of a form of planetary gearing to enable the arms 18—21 to be independently adjusted. The spindles for rollers 16, 16 have gears 27, 27 mounted thereon and the spindles for rollers 17, 17 have gears 28, 28 thereon. Both sets of gears mesh with gears 29, 29 secured to the pins 16' and 17' so as to simultaneously and synchronously rotate the rollers in the proper directions. Worm wheels 30, 30 are mounted on the lower ends of spindles 16' and 17' with each worm wheel meshing with the worms 31, 31 secured to shaft 32. Shaft 32 extends through one of the side walls of the centering mechanism 15 where another worm wheel 33 is mounted thereon which meshes with the worm 34 mounted on shaft 35, the shaft 35 then being connected to a suitable source of power for the purpose of driving each of the rollers 16, 16 and 17, 17. The rollers that are moved by the fluid motors 24 and 25 function not only as centering devices but also serve as clamps for the work piece and upon each occasion as the work piece passes the rollers 17, 17, excessive movement of the rollers toward the cutter axis is prevented by suitable adjustable stops 36 and 37 which limit the inward motion or the motion of the rollers 17, 17.

A modified form of the clamping, feeding and centering device is illustrated in Figs. 8 through 11. In this disclosure all of the rollers are moved by pressure fluid motors to produce a universal self-centering arrangement which automatically causes both sets of rollers to clamp or to be applied to work piece 10 and to be maintained at substantially the same distance from the center line of the cutter for the machine tool 1. In the previously discussed disclosure the rollers 16, 16 are manually adjusted and the degree of precision obtainable is such that it will be satisfactory only for round products having less than a given amount of oversize and when the oversize exceeds said amount, the resultant bar after cutting is not true because all of the oversize will be thrown to one side of the center line of the machine, thereby making the cut eccentric. In the modified construction the concentricity of the bar will be absolute regardless of the degree of oversize of the bar stock and the tolerances can be held to very close limits.

This modified device illustrated in Figs. 8-11 consists of rollers 38 and 39 as one set and 40 and 41 as another set. Rollers 38 and 39 are supported on spindles that are rotatably mounted in the free ends of arms 42 and 43 whose opposite ends are pivoted to spindle 44. Rollers 40 and 41 are supported on spindles that are rotatably mounted in the free ends of arms 45 and 46 whose opposite ends are pivoted to spindle 47. The upper ends of the roller spindles are rotatably received in one end of arms 48 and 49 whose other ends are pivoted to a pin 50 which is held in a casting 51 that is slidably received in a slot formed in member 52 bolted to the frame of the centering device. Rollers 38 and 40 are similarly connected to member 52. The frame 52 is capable of being laterally adjusted by screws 57, 58, as viewed in Fig. 10, so as to bring the center line of the slot therein in alignment with the center line or axis of the cutter of the machine tool 1. Each of the arms 42, 43, 45 and 46 have pressure fluid motors 53, 54, 55 and 56 operatively associated therewith through the piston rods of each. Each of the rollers is driven by gearing similarly organized to that described above. Fig. 15 shows the hydraulic circuit for the modified form of the invention. The motors 53, 54, 55 and 56 are shown in inoperative position. The valve 26 controls the operating sequence in order that the motors 54 and 56 are simultaneously operated so as to bring them first into engagement with the work piece and thereafter motors 53 and 55 are simultaneously operated so that the rollers associated therewith are brought into engagement with the work piece for the reasons previously set forth. Inasmuch as both sets of rollers are connected to their respective castings 51, which are slidably received in the slot in member 52, it follows that when both are actuated, the rate of movement of the rollers toward the work piece and the distance traveled will necessarily be the same because there cannot be any motion in one roller without the corresponding motion taking place in the other roller by reason of the linkage just described. For this reason the centering action of the pressure fluid motors and their associated rollers on the work piece is, therefore, absolute thereby equalizing the cut around the periphery of the work piece. This enables the operator to hold the size of the work to closer tolerances on all sizes of stock and positively maintains the concentricity of tubular and other round work. This is particularly useful when the work piece happens to be stock in which the outer portion is de-carbonized or de-alloyed, which calls for the removal of comparatively thin sections of material and which must be uniformly removed so as to preserve the inner core structure. If the tolerance were as great as those in the previously discussed structure, the usefulness of the work piece would be materially reduced. For similar reasons the modified form may be employed when tubular stock is being machined.

Another important advantage obtained is that work pieces can be fed continuously into the machine end-to-end. One cooperating pair of rollers feeds the bar that is being machined, while the second pair feeds a second bar that is in engagement with the first mentioned bar.

It is evident, therefore, that a centering, feeding and clamping device has been produced which, in cooperation with the feeding mechanism normally employed in these machines, will produce far more accurate results than any prior art structure.

What I claim is:

1. A mechanism to feed and align a work piece with respect to the longitudinal axis of a cutter head comprising a pair of rollers disposed on opposite sides of the work piece; a pressure fluid operated motor for each roller for moving the rollers toward and away from the work piece; a second pair of rollers disposed on opposite sides of the work piece and displaced from the first mentioned pair along the longitudinal axis of the work piece; means for rotating each of said rollers to feed the work piece; a hydraulic circuit for connecting each of said motors; a valve in said circuit for causing the motors to move the rollers toward and away from the cutter head axis; means in which said rollers are rotatably supported; a guide adjustably mounted on said means, said guide having a longitudinal slot parallel with the longitudinal axis of the cutter head, and means connecting each of said rollers and said guide so that the rollers of each pair will uniformly and simultaneously move with respect to the work piece, said connecting means including slide means movable on said guide, and arms connected between said slide means and said rollers.

2. A mechanism to feed and align a work piece with respect to the longitudinal axis of a cutter head; a pair of rollers disposed on opposite sides of the work piece; a second pair of rollers disposed on opposite sides of the work piece and displaced from said first mentioned pair along the longitudinal axis of the work piece; fluid motor means for moving at least one roller of each pair toward and away from the work piece; a circuit for said fluid motor means; a valve in said circuit for controlling the motion of the rollers toward and away from the cutter head axis; means on the mechanism for connecting the rollers of each pair for causing them to uniformly and simultaneously move same toward and away from the work piece, said means including an adjustable guide, slides on said guide and arms connecting said slides and rollers; and means for rotating each of said rollers to feed the work piece into the cutter head.

3. A mechanism to align and feed a work piece with respect to the longitudinal axis of a cutter head, said mechanism comprising a first pair of cooperating feed rollers disposed on opposite sides of the axis of the cutter head; a second pair of cooperating feed rollers disposed on opposite sides of the axis of the cutter head; fluid motor means connected with each of said feed rollers for displacing said feed rollers toward and away from the longitudinal axis of the cutter head; and means adapted to equalize the displacement of said feed rollers for retaining alignment of the work piece with the longitudinal axis of the cutter head, said equalizer including an adjustable guide member longitudinally aligned with the longitudinal axis of the cutter head, first and second slides movable longitudinally on said guide member, and arms connecting said first and second pair of feed rollers with said first and second slides to cause simultaneous and equal movement of the connected pair of feed rollers relative to the longitudinal axis of the cutter head under the operation of said fluid motor means.

4. A mechanism to align and feed a work piece with respect to the longitudinal axis of a cutter head, said mechanism comprising a first pair of cooperating feed rollers disposed on opposite sides of the axis of the cutter head; a second pair of cooperating feed rollers disposed on opposite sides of the axis of the cutter head; fluid motor means connected with each of said feed rollers for displacing said feed rollers toward and away from the longitudinal axis of the cutter head; power means connected to drive all of said feed rollers for feeding the work piece; and means adapted to equalize the displacement of said feed rollers for retaining alignment of the work piece with the longitudinal axis of the cutter head, said equalizer including an adjustable guide member longitudinally aligned with the longitudinal axis of the cutter head, first and second slides movable longitudinally on said guide member, and arms connecting said first and second pair of feed rollers with said first and second slides to cause simultaneous and equal movement of the connected pair of feed rollers relative to the longitudinal axis of the cutter head under the operation of said fluid motor means.

5. A mechanism to align and feed a work piece with respect to the longitudinal axis of a cutter head, said mechanism comprising a first pair of cooperating feed rollers disposed on opposite sides of the axis of the cutter head; a second pair of cooperating feed rollers disposed on opposite sides of the axis of the cutter head; fluid motor means connected with each of said feed rollers for displacing said feed rollers toward and away from the longitudinal axis of the cutter head; power means connected to said feed rollers to rotate the latter and feed the work piece, and radius arms connected between said power means and feed rollers to maintain driving connection thereof in all positions of movement of said feed rollers; and means adapted to equalize the displacement of said feed rollers for retaining alignment of the work piece with the longitudinal axis of the cutter head, said equalizer including an adjustable guide member longitudinally aligned with the longitudinal axis of the cutter head, first and second slides movable longitudinally on said guide member, and arms connecting said first and second pair of feed rollers with said first and second slides to cause simultaneous and equal movement of the connected pair of feed rollers relative to the longitudinal axis of the cutter head under the operation of said fluid motor means.

6. A mechanism to align and feed a work piece with respect to the longitudinal axis of a cutter head, said mechanism comprising a first pair of cooperating feed rollers disposed on opposite sides of the axis of the cutter head; a second pair of cooperating feed rollers disposed on opposite sides of the axis of the cutter head; fluid motor means connected with each of said feed rollers for displacing said feed rollers toward and away from the longitudinal axis of the cutter head; and means adapted to equalize the displacement of said feed rollers for retaining alignment of the work piece with the longitudinal axis of the cutter head, said equalizer including an adjustable guide member having an elongated opening aligned with the cutter head axis at one side thereof, slide means movable in said elongated opening, and means individually connecting said pairs of feed rollers with said slide means, said slide means causing simultaneous and equal movement of the pair of feed rollers caused to be moved by the fluid motor means connected thereto.

7. A mechanism to align and feed a work piece with respect to the longitudinal axis of a cutter head, said mechanism comprising a first pair of cooperating feed rollers disposed on opposite sides of the axis of the cutter head; a second pair of cooperating feed rollers disposed on opposite sides of the axis of the cutter head; fluid motor means connected with each of said feed rollers for displacing said feed rollers toward and away from the longitudinal axis of the cutter head; power means connected to said feed rollers to rotate the latter and feed the work piece, and radius arms connected between said power means and feed rollers to maintain driving connection thereof in all positions of movement of said feed rollers; and means adapted to equalize the displacement of said feed rollers for retaining alignment of the work piece with the longitudinal axis of the cutter head, said equalizer including an adjustable guide member having an elongated opening aligned with the cutter head axis at one side thereof, slide means movable in said elongated opening, and means individually connecting said pairs of feed rollers with said slide means, said slide means causing simultaneous and equal movement of the pair of feed rollers caused to be moved by the fluid motor means connected thereto.

WALTER SIEGERIST.

References Cited in the file of this patent

UNITED STATES PATENTS

| Number | Name | Date |
|---|---|---|
| 1,312,881 | Weiss et al. | Aug. 12, 1919 |
| 2,067,626 | Benninghoff | Jan. 12, 1937 |
| 2,311,998 | Pope | Feb. 23, 1943 |
| 2,371,090 | Westin et al. | Mar. 6, 1945 |
| 2,389,556 | Siegerist | Nov. 20, 1945 |
| 2,441,925 | Wege | May 18, 1948 |

FOREIGN PATENTS

| Number | Country | Date |
|---|---|---|
| 566,194 | Germany | Dec. 13, 1932 |